Sept. 21, 1965         W. H. BRONTE ETAL         3,207,412
         BOTTOM UNLOADING CONTAINER ASSEMBLY AND METHOD
                    FOR UNLOADING CONTAINERS
Filed Jan. 2, 1962                              2 Sheets-Sheet 1

INVENTORS
WILLIAM H. BRONTE &
STANLEY E. LINGENFELTER
BY
*Gardner & Zimmerman*
ATTORNEYS Sept. 21, 1965         W. H. BRONTE ETAL                    3,207,412
              BOTTOM UNLOADING CONTAINER ASSEMBLY AND METHOD
Filed Jan. 2, 1962          FOR UNLOADING CONTAINERS            2 Sheets-Sheet 2

INVENTORS
WILLIAM H. BRONTE &
STANLEY E. LINGENFELTER
BY
Gardner & Zimmerman
ATTORNEYS

United States Patent Office 3,207,412
Patented Sept. 21, 1965

3,207,412
BOTTOM UNLOADING CONTAINER ASSEMBLY AND METHOD FOR UNLOADING CONTAINERS
William H. Bronte and Stanley E. Lingenfelter, Oakland, Calif., assignors to Corrobilt Container Co., Alameda, Calif., a corporation of California
Filed Jan. 2, 1962, Ser. No. 163,749
3 Claims. (Cl. 229—17)

This invention relates generally to containers constructed out of corrugated cardboard or the like, and more particularly is directed to a method for unloading containers of the character described and to a container which is suitable for unloading through its bottom while maintained in an upright position.

Conventional containers for packaging large quantities of grain, flour, or similar products are generally placed upon a pallet to facilitate shipping. Although use of the pallet provides for simple raising and lowering by a fork lift or pallet jack, the job of unloading is nevertheless difficult in that the conventional container must be tilted and emptied from the top. Since the contents of these containers often weigh upwards of one ton, it is appreciated that unloading can be complex and time consuming, and may significantly add to the total cost of shipping.

In order to further facilitate unloading, this invention provides a novel method for unloading through the container's bottom while it is lifted in an upright position over the receptacle into which it is to be emptied. Furthermore, this invention provides a novel container assembly including a container placed upon a specially adapted pallet whereby the container may be emptied through its bottom and through the pallet. It will be further appreciated that the container used as a part of the instant assembly is basically a conventional collapsible box that is easily stored while not in use, but which is provided with the modification of the bottom unloading feature of this invention.

Accordingly, it is a primary object of this invention to provide a novel container assembly of the character described suitable for unloading a container through its bottom.

Another object of this invention is to provide a novel container adapted for unloading through its bottom.

A further object of this invention is to provide a pallet adapted to have a central portion thereof opened for unloading a container through its bottom while resting upon the pallet.

Still another object is to provide a method for unloading a container through its bottom.

An even further object is to provide a method and container assembly which reduced the time and effort involved in unloading a container of the character described.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a bottom perspective view of a container assembly embodying the present invention being unloaded while suspended by a fork lift.

FIGURE 2 is a perspective view of the novel pallet forming a part of the instant container assembly.

FIGURE 3 illustrates a preformed sheet of material for assembly into a container embodying the features of this invention.

FIGURE 4 is a perspective view of the instant container assembly during one step of assembling the container and placing it on top of the instant pallet.

FIGURE 5 is a perspective view of the instant container assembly during a subsequent step of assembly to that shown in FIGURE 4.

Figure 6:
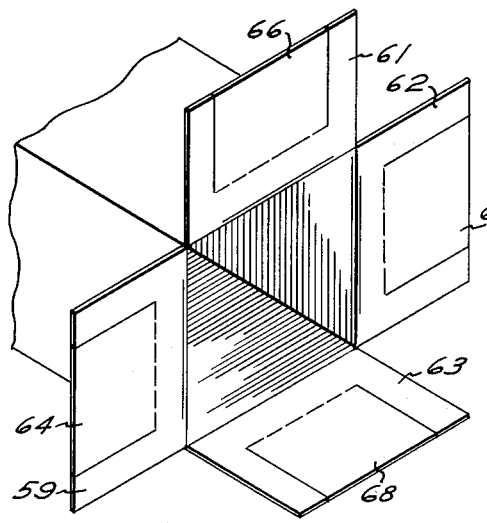
FIGURE 6 illustrates a bottom view of a container comprising an alternative embodiment of the invention prior to its complete assembly.
Figure 7:
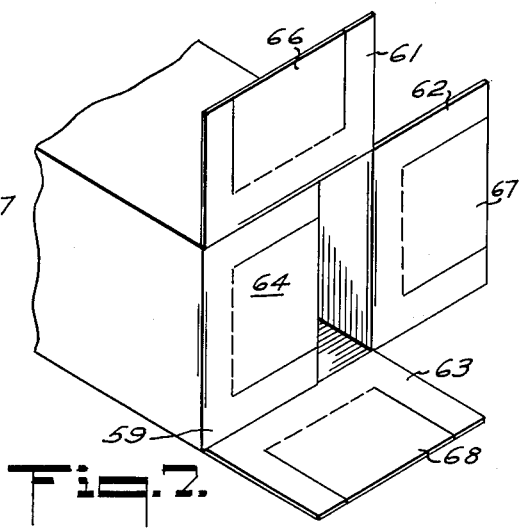
FIGURE 7 illustrates the container of FIGURE 6 after a subsequent step of assembly to that shown in FIGURE 6.
Figure 8:
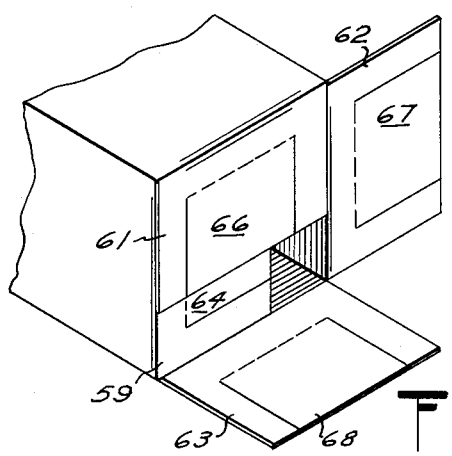
FIGURE 8 shows a subsequent step in the assembly of the container shown in FIGURE 7.
Figure 9:
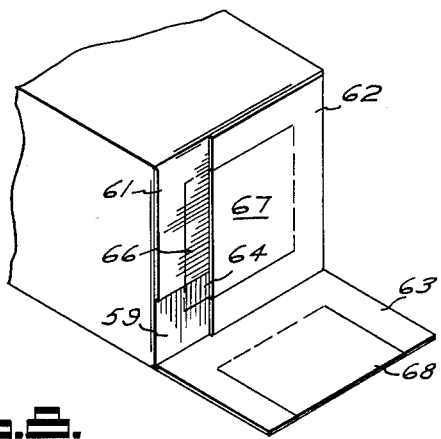
FIGURE 9 shows a subsequent step in the assembly of the container shown in FIGURE 8.

Looking now at FIGURE 1 of the drawing, there is shown a container assembly 16 including a container 17 disposed on top of a pallet 18. The two forks 19 and 21 of a fork lift are shown supporting the pallet 18 while a bottom opening 22 in the container 17 provides means for unloading the container. A center runner 23 of the pallet 18 is shown displaced from the pallet to allow the bottom of the container 17 to be opened as is described more fully hereinafter.

The pallet 18 is shown in greater detail in FIGURE 2, and is seen to include two elongated spaced runners 24 and 26. A platform 27 is secured between the runners 24 and 26 and has a central opening 28. Preferably, the platform 27 includes two spaced top deck boards 29 and 31 mounted transversely on the runners 24 and 26, and may also include two spaced deck boards 32 and 33 secured longitudinally on top of the runners 24 and 26 respectively. The third runner 23 is normally disposed beneath the opening 28 to provide support thereunder, but is adapted to be displaced to leave the opening 28 unobstructed. A pair of bottom deck boards 34 and 36 are preferably secured transversely between the runners 24 and 26 and spaced below the platform 27 to thereby provide means for movable retention of the center runner 23.

As regards now the container 17, there is shown in FIGURE 3 a preformed sheet of material 37 ready for assembly into a container embodying the features of this invention. More specifically, the preformed sheet is seen to include a generally rectangular portion 38 which is creased or scored along three parallel lines 39, 41 and 42 to divide the portion 38 into four side sections designated respectively by the numerals 43, 44, 46 and 47. In this conventional manner the portion 38 may be folded along the three lines to form a box of rectangular cross section, there being provided a tab 48 for securing the side section 43 to the side 47 by glue, staples or other suitable means.

Also in a conventional manner, four end flaps 49, 51, 52 and 53 extend respectively from the four side sections to provide a bottom for the box, as is described hereinafter. The end flaps are each scored along the line 55 to facilitate their being folded over the end of the box. The four end flaps are then provided respectively with central dumping flaps 54, 56, 57 and 58, which are formed by inwardly extending pairs of slits 59 and 60, and which are scored along the lines 61 to allow them to be readily folded.

Looking now to FIGURE 4, the sheet 37 is folded into the container 17 with the end flap 49 laying flat on the pallet 18. End flaps 51 and 53 are folded over the end opening of the container 17 and each extend substantially half way across the opening to meet adjacent their extended edges. In FIGURE 5 the end flaps 49 and 52 are seen to be folded over the end flaps 51 and 53 and likewise meet adjacent their extended edges. It is important to note that the dumping flaps 56 and 58 are now disposed over the dumping flaps 54 and 57 in alignment therewith.

When the container 17 is then tilted into an upright position on top of the pallet 18 the runner 23 is disposed beneath the dumping flaps 54 and 57 thus maintaining them in a closed position.

In operating the instant container assembly a fork lift or other similar apparatus is used to lift the pallet 18 directly over the intended receptacle for the contents of the container 17. It should be noted that while the container 17 is normally resting on the pallet the weight of the contents is sufficient to keep the center runner 23 secured in place. Moreover, it is not necessary to glue, staple, or otherwise secure the bottom end flaps of the container together inasmuch as little or no leakage occurs therethrough and provision is thereby made for allowing shifting of the load in transit while preventing breakage along the bottom of the container. Now, once the fork lift has engaged and raised the pallet 18, the downward load on the center runner is largely relieved. With little effort the runner 23 can be tamped out from the pallet, as indicated in FIGURE 1, whereby the dumping flaps are free to fold downwardly under the pressure of the load to form the opening 22 in the bottom of the container 17. In this manner the contents of the container are simply and quickly unloaded.

Figure 11:
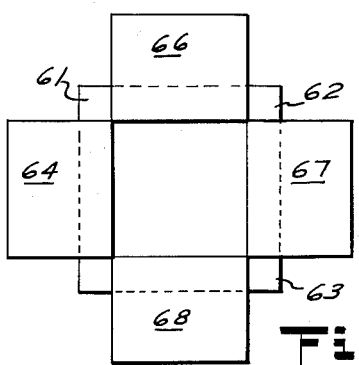
FIGURE 11 is a bottom view of the container shown in FIGURE 10 with its bottom opened for unloading.
Figure 10:
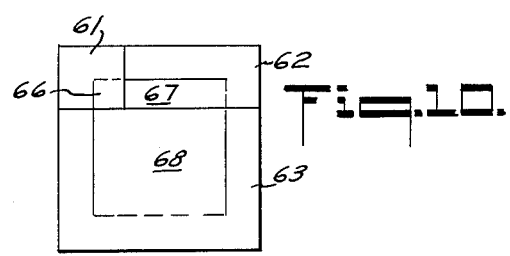
FIGURE 10 is a bottom view of the container shown in FIGURES 6–9 after having been completely assembled.

An alternative embodiment of the container 17 is illustrated in FIGURES 6–11, and in FIGURE 6 the container is shown as having four end flaps 59, 61, 62 and 63. These end flaps each have, respectively, dumping flaps 64, 66, 67 and 68. The distinguishing feature of this alternative embodiment is that the end flaps each extend about two thirds of the way across the end opening of the container, and inasmuch as they each overlap one another as indicated in the sequence of FIGURES 7–10, a tighter seal is formed on the bottom of the box and may be advantageous when the contents of the container are a very fine flour or the like. In accordance with this alternative embodiment, each of the respective dumping flaps is disposed in direct alignment with the other dumping flaps, whereas in comparison, the embodiment of FIGURES 4 and 5 had two adjacent dumping flaps overlie two other adjacent dumping flaps. Nevertheless, as shown in FIGURE 11, the four dumping flaps 64, 66, 67 and 68 are adapted to fold open upon pressure of the container contents to form an opening 22 in much the same manner as the first described embodiment. It should be noted that the sequence of folding over the end flaps as indicated in FIGURES 7–10 is not exclusive, and various sequences are possible.

From the foregoing it will be apparent that the present invention provides a novel method for unloading containers of the character described. Rather than having to tilt and empty containers from the top, the instant method includes the steps of removing a central portion of the pallet and opening the bottom of the container to allow the contents to unload downwardly through the pallet. Thus the method and apparatus of this invention provide for a more simple and efficient way to unload containers and accordingly facilitate the over-all shipping operation.

What is claimed is:

1. A bottom unloading box comprising a main hollow body having four orthogonal sides and two open ends of rectangular configuration, a first end flap extending integrally from a first of said sides and folded partly over one of said open ends substantially perpendicularly to said sides, said end flaps having a first dumping flap defined by a pair of spaced parallel slits extending inwardly from the end edge of said end flap and terminating at points spaced from said first side, said slits and dumping flap defining a peripheral portion of said end flap surrounding three sides of said dumping flap, a second end flap extending integrally from one of said sides spaced oppositely from said first side, said second end flap folded partly over said open end substantially perpendicularly to said sides and having a second dumping flap and peripheral portion similar to said first dumping flap, a third end flap extending integrally from a third of said sides and folded partly over said open end substantially perpendicularly to said sides, said third end flap having a third dumping flap and peripheral portion similar to said first dumping flap, and a fourth end flap extending integrally from the fourth of said sides and folded partly over said open end substantially perpendicularly to said sides, said fourth end flap having a fourth dumping flap and peripheral portion similar to said first dumping flap, said first and second end flaps respectively transversely overlying said third and fourth end flaps, said first and second dumping flaps respectively overlying said third and fourth dumping flaps, each of said dumping flaps adapted to fold away from said body to form an opening through said end flaps, said opening being surrounded by said peripheral portions of said end flaps.

2. A box as described in claim 1 further defined by each of said flaps extending more than half way across said end opening, said second flap partially overlying said first flap, said fourth flap partially overlying said third flap, and said dumping flaps being aligned respectively on top of one another and surrounded by said peripheral portions of said end flaps.

3. A preformed piece of material for assembly into a bottom unloading box comprising a thin generally rectangular planar portion, said portion being scored along three parallel lines to divide said portion into four rectangular side sections, and four substantially identical end flap portions each extending respectively from corresponding ends of said four side sections, said flap portions each being scored along a line contiguous with said ends of said side sections to form a hinge line, each of said flap portions having a pair of parallel spaced slits extending inwardly from the end edges of said flap portions toward the respective side sections and being equidistantly spaced from the side edges of said end flaps, said slits having their inner ends equidistantly spaced from said hinge lines, said end flap portions each being scored along a line between the corresponding inner ends of said pairs of slits.

References Cited by the Examiner

UNITED STATES PATENTS

| | | | |
|---|---|---|---|
| 1,443,279 | 1/23 | Schindler | 229—17 |
| 1,712,249 | 9/29 | Byrne. | |
| 2,053,217 | 5/36 | Foerstner et al. | 229—17 |
| 2,326,527 | 8/43 | Emmerick | 229—17 |
| 2,341,397 | 2/44 | Smith | 229—17 |
| 2,360,415 | 10/44 | Gilbert | 229—17 |
| 2,727,641 | 12/55 | Tomkins | 214—307 |
| 2,753,062 | 7/56 | Loudon | 214—307 |
| 2,904,297 | 9/59 | Hamilton | 248—120 |
| 2,930,560 | 3/60 | Carnwath et al. | 248—120 |

FRANKLIN T. GARRETT, *Primary Examiner.*

HUGO O. SCHULZ, EARLE J. DRUMMOND,
*Examiners.*